(12) United States Patent
Izawa et al.

(10) Patent No.: US 11,283,287 B2
(45) Date of Patent: Mar. 22, 2022

(54) VEHICLE POWER-SUPPLY SYSTEM

(71) Applicant: Yazaki Corporation, Tokyo (JP)

(72) Inventors: Takaaki Izawa, Shizuoka (JP);
Masataka Komiyama, Shizuoka (JP);
Yuta Ishikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/155,053

(22) Filed: Jan. 21, 2021

(65) Prior Publication Data
US 2021/0242712 A1 Aug. 5, 2021

(30) Foreign Application Priority Data

Jan. 30, 2020 (JP) .............................. JP2020-013200

(51) Int. Cl.
*H02J 9/06* (2006.01)
*H02J 7/00* (2006.01)
*H02J 7/14* (2006.01)
*H02M 3/158* (2006.01)
*B60R 16/033* (2006.01)

(52) U.S. Cl.
CPC ............ *H02J 9/061* (2013.01); *B60R 16/033* (2013.01); *H02J 7/0047* (2013.01); *H02J 7/1423* (2013.01); *H02M 3/158* (2013.01)

(58) Field of Classification Search
CPC ........ H02J 9/061; H02J 7/0047; H02J 7/1423; B60R 16/033; H02M 3/158

USPC .................................................. 307/10.1, 64
See application file for complete search history.

(56) References Cited

U.S. PATENT DOCUMENTS

| 2018/0334037 A1 | 11/2018 | Masui et al. | |
| 2018/0354436 A1* | 12/2018 | Sato | .......... H02H 9/00 |
| 2021/0066956 A1* | 3/2021 | Izawa | ....... B60L 3/04 |

FOREIGN PATENT DOCUMENTS

JP    2016-7993 A    1/2016

* cited by examiner

*Primary Examiner* — Michael R. Fin
(74) *Attorney, Agent, or Firm* — Kenealy Vaidya LLP

(57) ABSTRACT

In a vehicle power-supply system, a backup power-supply device includes a low-voltage DC/DC converter, a backup battery, and switching mechanisms. A bidirectional switch unit is provided between a high-voltage DC/DC converter and a connecting point on a connecting wire and passes or interrupts a current flowing between the high-voltage DC/DC converter and the connecting point. A bidirectional switch unit is provided between the connecting point and a connecting point on a connecting wire and passes or interrupts a current flowing between the connecting point and the connecting point. A unidirectional switch unit is provided between the connecting point and the low-voltage DC/DC converter on the connecting wire and passes or interrupts a current flowing from the connecting point to the low-voltage DC/DC converter.

4 Claims, 8 Drawing Sheets

VEHICLE POWER-SUPPLY SYSTEM

CROSS-REFERENCE TO RELATED APPLICATION(S)

The present application claims priority to and incorporates by reference the entire contents of Japanese Patent Application No. 2020-013200 filed in Japan on Jan. 30, 2020.

BACKGROUND OF THE INVENTION

1. Field of the Invention

The present invention relates to a vehicle power-supply system.

2. Description of the Related Art

As a vehicle power-supply system, there has been conventionally described, for example, in Japanese Patent Application. Laid-open No. 2016-7993, a vehicle power-supply system including a power supply that includes a main battery and a sub battery and supplies power to a load unit, and a relay unit that switches the power supply for supplying power to the load unit, between the main battery and the sub battery.

In the meantime, it is desired that the vehicle power-supply system described in Japanese Patent Application Laid-open No. 2016-7993 can continuously supply power to an important load unit at the time of occurrence of abnormality in the power supply during driving of a vehicle, for example.

SUMMARY OF THE INVENTION

In view of the above-described situation, the present invention has been made and it is an object to provide a vehicle power-supply system that can properly supply power to a load unit even in the event of occurrence of abnormality.

In order to achieve the above mentioned object, a vehicle power-supply system according to one aspect of the present invention includes a main power-supply device mounted in a vehicle and configured to supply power to a first load unit and a second load unit; and a backup power-supply device mounted in the vehicle and configured to supply power to the second load unit while supplying no power to the first load unit when the main power-supply device is in an abnormal state, wherein the main power-supply device includes a first DC/DC converter configured to transform a voltage of direct-current power supplied from a power supply unit and supply the transformed direct-current power to the first load unit and the second load unit, and a first battery configured to store the direct-current power transformed by the first DC/DC converter and supply the stored direct-current power to the first load unit and the second load unit, the backup power-supply device includes: a second DC/DC converter configured to transform a voltage of the direct-current power output from the first DC/DC converter; a second battery configured to store the direct-current power transformed by the second DC/DC converter and supply the stored direct-current power to the second load unit; a first switching mechanism and a second switching mechanism configured to pass or interrupt a current; a first connecting wire; a second connecting wire; a third connecting wire; and a fourth connecting wire, the first connecting wire connects the first DC/DC converter and the second DC/DC converter, the second connecting wire connects the second DC/DC converter and the second battery, the third connecting wire connects a first connecting point on the first connecting wire and the second load unit, the fourth connecting wire connects a second connecting point on the second connecting wire and a third connecting point on the third connecting wire, the second switching mechanism is provided between the second connecting point and the third connecting point on the fourth connecting wire and passes or interrupts a current flowing between the second connecting point and the third connecting point, the first switching mechanism includes: a first bidirectional switch unit that includes a first semiconductor switch and a second semiconductor switch and is connected so that the first semiconductor switch and the second semiconductor switch are so positioned as to make a forward direction of a parasitic diode of the first semiconductor switch and a forward direction of a parasitic diode of the second semiconductor switch opposite to each other; a second bidirectional switch unit that includes a third semiconductor switch and a fourth semiconductor switch and is connected so that the third semiconductor switch and the fourth semiconductor switch are so positioned as to make a forward direction of a parasitic diode of the third semiconductor switch and a forward direction of a parasitic diode of the fourth semiconductor switch opposite to each other; and a unidirectional switch unit including a fifth semiconductor switch, the first bidirectional switch unit is provided between the first DC/DC converter and the first connecting point on the first connecting wire and passes or interrupts a current flowing between the first DC/DC converter and the first connecting point, the second bidirectional switch unit is provided between the first connecting point and the third connecting point on the third connecting wire and passes or interrupts a current flowing between the first connecting point and the third connecting point, and the unidirectional switch unit is provided between the first connecting point and the second DC/DC converter on the first connecting wire and passes or interrupts a current flowing from the first connecting point to the second DC/DC converter.

According to another aspect of the present invention, in the vehicle power-supply system, it is preferable that the backup power-supply device further includes a controller configured to control the first switching mechanism and the second switching mechanism, each of the first switching mechanism and the second switching mechanism passes a current by turn-on and interrupts a current by turn-off, and when the main power-supply device is in an abnormal state and the backup power-supply device is normally operating, the controller turns off all of the first semiconductor switch, the second semiconductor switch, the third semiconductor switch, the fourth semiconductor switch, and the fifth semiconductor switch in the first switching mechanism and turns on the second switching mechanism to allow power to be supplied to the second load unit from the second battery while interrupting electrical connection between the main power-supply device and the backup power-supply device.

According to another aspect of the present invention, in the vehicle power-supply system, it is preferable that the backup power-supply device further includes a controller configured to control the first switching mechanism and the second switching mechanism, each of the first switching mechanism and the second switching mechanism passes a current by turn-on and interrupts a current by turn-off, and when the main power-supply device is normally operating and the backup power-supply device is in an abnormal state, the controller turns off all of the first semiconductor switch, the second semiconductor switch, the third semiconductor switch, the fourth semiconductor switch, and the fifth semiconductor switch in the first switching mechanism and turns off the second switching mechanism to forbid power to be supplied to the second load unit from the second battery while interrupting electrical connection between the main power-supply device and the backup power-supply device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will be described is detail with reference to the drawings. The present invention is not limited to the contents described in the following embodiment. Meanwhile, components described below include ones that can be easily conceived of by a person skilled in the art and ones that are substantially the same therewith. Further, configurations described below can be appropriately combined with each other. Moreover, various omissions, replacements, or alterations in the configurations are possible within a scope not departing from the gist of the present invention.

Embodiment

Figure 1:
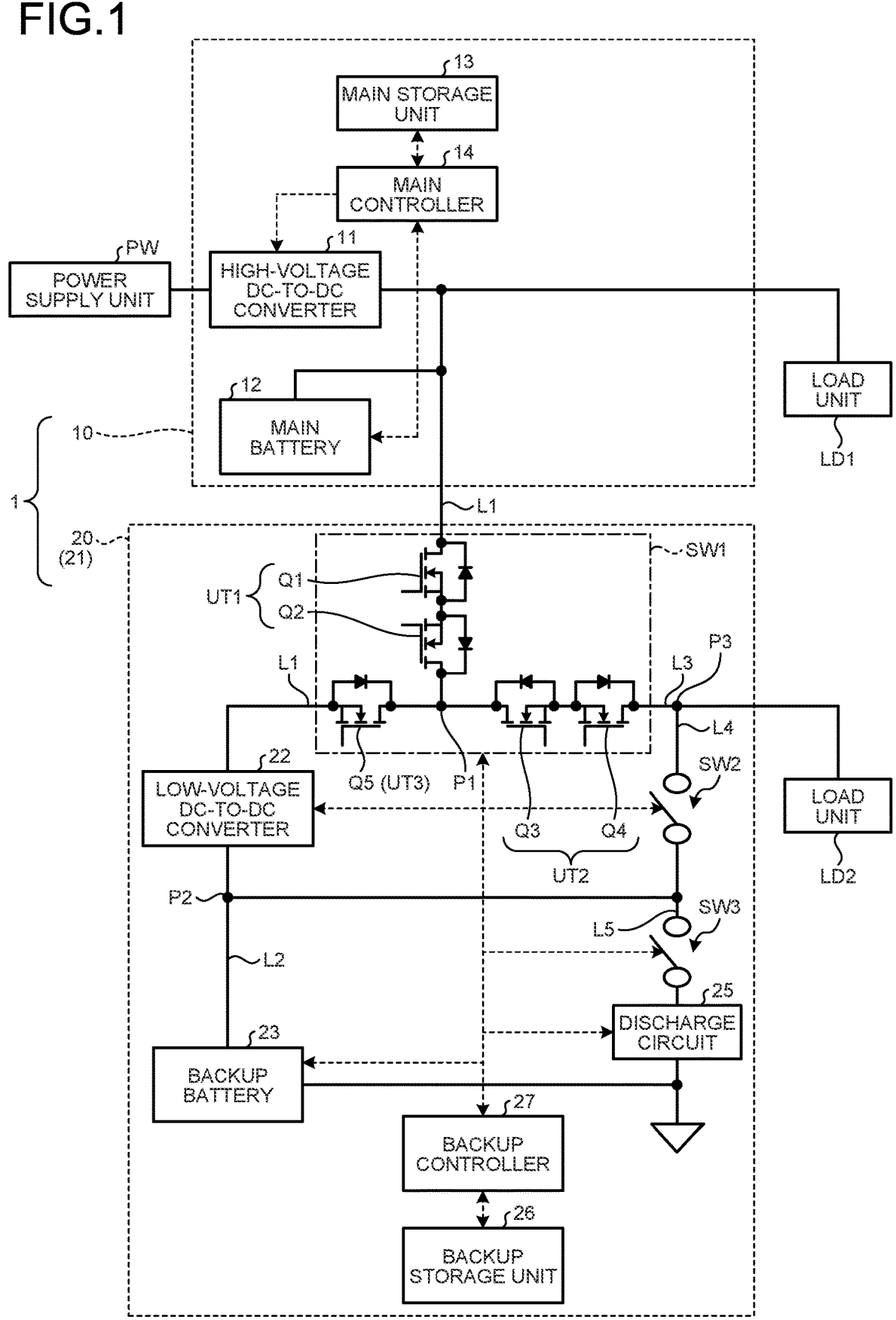
FIG. 1 is a block diagram illustrating an example of a configuration of a vehicle power-supply system according to an embodiment.

A vehicle power-supply system 1 according to the embodiment will be described with reference to the drawings. FIG. 1 is a block diagram illustrating an example of a configuration of the vehicle power-supply system 1 according to the embodiment.

The vehicle power-supply system 1 is mounted in an electric vehicle or the like and supplies direct-current power (also simply referred to as "power") to a load unit LD1 serving as a first load unit and a load unit LD2 serving as a second load unit. Here, the load unit LD1 includes a general load of an air conditioner, an audio product, or the like, and an important load of a steering device, a brake device, a sensor, or the like, for example. The load unit LD2 includes an important load of a steering device, a brake device, a sensor, or the like, for example. A General load is a load required to allow a passenger of a vehicle to spend time comfortably in the interior of the vehicle. An important load is a load required to cause a vehicle to run to a safe place. As illustrated in FIG. 1, the vehicle power-supply system 1 includes a main power-supply device 10 and a backup power-supply device 20, the main power-supply device 10 and the backup power-supply device 20 are formed separately from each other, and the vehicle power-supply system 1 has a configuration in which the backup power-supply device 20 can be added to (i.e., can be an add-on component of) the main power-supply device 10.

The main power-supply device 10 supplies power to the load unit LD1 and the load unit LD2. The main power-supply device 10 includes a high-voltage DC/DC converter 11 serving as a first DC/DC converter, a main battery 12 serving as a first battery, a main storage unit 13, and a main controller 14.

The high-voltage DC/DC converter 11 transforms a direct-current voltage. The high-voltage DC/DC converter 11 is connected to a power supply unit (power generator, for example) PW that externally supplies direct-current power, for example, and steps down a voltage (several hundred volts or 48 volts, for example) of a direct-current power output from the power supply unit PW. The high-voltage DC/DC converter 11 steps down a voltage to a voltage of 12 V, for example. The high-voltage DC/DC converter 11 is connected to the main battery 12 and outputs a stepped-down direct-current power to the main battery 12. Further, the high-voltage DC/DC converter 11 is connected to the load unit LD1 and is also connected to the load unit LD2 via the backup power-supply device 20. The high-voltage DC/DC converter 11 supplies power to the load unit LD1 and also supplies power to the load unit LD2 via the backup power-supply device 20.

The main battery 12 stores therein power and is a lead storage battery, for example. The main battery 12 is connected to the high-voltage DC/DC converter 11 and stores therein direct-current power stepped down by the high-voltage DC/DC converter 11. Further, the main battery 12 is connected to the load unit LD1 and is also connected to the load unit LD2 via the backup power-supply device 20. The main battery 12 supplies power to the load unit LD1 and also supplies power to the load unit LD2 via the backup power-supply device 20.

The main storage unit 13 is a non-volatile memory that stores therein information. The main storage unit 13 stores therein a first control program for operating the main controller 14, and the like.

The main controller 14 controls the high-voltage DC/DC converter 11. The main controller 14 includes an electronic circuit formed mainly of a known microcomputer including a CPU and an interface. The main controller 14 is connected to the main storage unit 13 and reads out the first control program stored in the main storage unit 13. Then, the main controller 14 operates in accordance with the first control program as read out. The main controller 14 controls the high-voltage DC/DC converter 11 and monitors a power storage state of the main battery 12 in accordance with the first control program, for example.

The backup power-supply device 20 supplies power to the load unit LD2 in place of the main power-supply device 10 at the time of occurrence of abnormality such as a ground fault in the main power-supply device 10. Additionally, the backup power-supply device 20 supplies no power to the load unit LD1 irrespective of a state (normal or abnormal) of the main power-supply device 10. The backup power-supply device 20 is connected to the main power-supply device 10 and the load unit LD2 via a connector (not illustrated), for example. The backup power-supply device 20 includes a connecting wire L1 serving as a first connecting wire, a connecting wire L2 serving as a second connecting wire, a connecting wire L3 serving as a third connecting wire, a connecting wire L4 serving as a fourth connecting wire, a casing 21, a low-voltage DC/DC converter 22, a backup battery 23 serving as a second battery, a switching mechanism SW1, switching mechanisms SW2 and SW3, a discharge circuit 25, a backup storage unit 26, and a backup controller 27.

The connecting wire L1 is a conductive electric wire or the like and connects the high-voltage DC/DC converter 11 and the low-voltage DC/DC converter 22. The connecting wire L2 is a conductive electric wire or the like and connects the low-voltage DC/DC converter 22 and the backup battery 23. The connecting wire L3 is a conductive electric wire or the like and connects a connecting point P1 on the connecting wire L1 and the load unit LD2. More specifically, the connecting wire L3 branches off from the connecting wire L1 at the connecting point P1 and an end thereof on a side opposite to the connecting point P1 is connected to the load unit LD2. The connecting wire L4 is a conductive electric wire or the like and connects a connecting point P2 on the connecting wire L2 and a connecting point P3 on the connecting wire L3. More specifically, the connecting wire L4 branches off from the connecting wire L2 at the connecting point P2 and an end thereof on a side opposite to the connecting point P2 is connected to the connecting point P3.

The casing 21 contains various kinds of electronic components. The casing 21 is formed in a shape of a box having a heat dissipating function. The casing 21 is formed separately from the main power-supply device 10. The casing 21 holds, in its internal space, the low-voltage DC/DC converter 22, the backup battery 23, the switching mechanism SW1, the switching mechanisms SW2 and SW3, the discharge circuit 25, the backup storage unit 26, and the backup controller 27. Additionally, the backup battery 23 may be provided externally to the casing 21, instead of being held in the internal space of the casing 21.

The low-voltage DC/DC converter 22 transforms a direct-current voltage. The low-voltage DC/DC converter 22 is connected to the high-voltage DC/DC converter 11 via the connecting wire L1. When it becomes necessary to charge the backup battery 23, the low-voltage DC/DC converter 22 receives direct-current power that is stepped down from a high voltage to a low voltage and is output by the high-voltage DC/DC converter 11, and steps up the voltage of the received power to a terminal voltage of the backup battery 23 or higher. The low-voltage DC/DC converter 22 is connected to the backup battery 23 via the connecting wire 22 and outputs the stepped-up direct-current power to the backup battery 23. As described above, the low-voltage DC/DC converter 22 is a unidirectional converter that converts a voltage of direct-current power supplied from the high-voltage DC/DC converter A1 and outputs it to the backup battery 23. In other words, the low-voltage DC/DC converter 22 is not a bidirectional converter, and thus neither converts direct-current power supplied from the backup battery 23 nor outputs it to the load unit LD2 or the like.

The backup battery 23 stores therein power and is a lithium-ion battery, for example. The backup battery 23 is connected to the low-voltage DC/DC converter 22 via the connecting wire 12 and stores therein direct-current power stepped up by the low-voltage DC/DC converter 22. The backup battery 23 is connected to the load unit LD2 via the connecting wire L4 and supplies direct-current power stored therein, to the load unit LD2.

The switching mechanism SW1 passes a current when turned on and interrupts a current when turned off. The switching mechanism SW1 includes a bidirectional switch unit UT1, a bidirectional switch unit UT2, and a unidirectional switch unit UT3.

The bidirectional switch unit UT1 passes or interrupts a current flowing bidirectionally and includes a field-effect transistor (YET) Q1 and an FET Q2. The FETs Q1 and Q2 are each an N-channel metal-oxide-semiconductor (TAO) FET, for example. The bidirectional switch unit UT1 is connected so that the FETs Q1 and Q2 are so positioned as to make a forward direction of a parasitic diode of the FET Q1 and a forward direction of a parasitic diode of the FET Q2, opposite to each other. Specifically, in the bidirectional switch unit UT1, a source terminal of the FET Q1 and a source terminal of the FET Q2 are connected to each other. The bidirectional switch unit UT1 is provided between the high-voltage DC/DC converter 11 and the connecting point P1 on the connecting wire L1, and has a drain terminal of the FET Q1 connected to the high-voltage DC/DC converter 11 while having a drain terminal of the FET Q2 connected to the connecting point P1. The bidirectional switch unit Urn passes a current flowing between the high-voltage DC/DC converter 11 and the connecting point P1 by turn-on of the FETs Q1 and Q2 in response to a switching signal output from the backup controller 27. On the other hand, the bidirectional switch unit UT1 interrupts a current flowing between the high-voltage DC/DC converter 11 and the connecting point P1 by turn-off of the FETs Q1 and Q2.

The bidirectional switch unit UT2 passes or interrupts a current flowing bidirectionally and includes an FET Q3 and an FET Q4. The FETs Q3 and Q4 are each an N-channel MOSFET, for example. The bidirectional switch unit UT2 is connected so that the FETs Q3 and Q4 are so positioned as to make a forward direction of a parasitic diode of the FET Q3 and a forward direction of a parasitic diode of the FET Q4, opposite to each other. Specifically, in the bidirectional switch unit UT2, a source terminal of the FET Q3 and a source terminal of the FET Q4 are connected to each other. The bidirectional switch unit UT2 is provided between the connecting point P1 and the connecting point P3 on the connecting wire L3, and has a drain terminal of the FET Q3 connected to the connecting point P1 while having a drain terminal of the FET Q4 connected to the connecting point P3. The bidirectional switch unit UT2 passes a current flowing between the connecting point P1 and the connecting point P3 by turn-on of the FETs Q3 and Q4 in response to a switching signal output from the backup controller 27. On the other hand, the bidirectional switch unit UT2 interrupts a current flowing between the connecting point P1 and the connecting point P3 by turn-off of the PETS Q3 and Q4.

The unidirectional switch unit UT3 passes or interrupts a current flowing unidirectionallv and includes an FET Q5. The FET Q5 is an N-channel MOSFET, for example. The FET Q5 is provided between the connecting point P1 and the low-voltage DC/DC converter 22 on the connecting wire L1, and has a source terminal connected to the low-voltage DC/DC converter 22 while having a drain terminal connected to the connecting point P1. The FET Q5 passes a current flowing from the connecting point P1 to the low-voltage DC/DC converter 22 when turned on in response to a switching signal output from the backup controller 27. On the other hand, the FET Q5 interrupts a current flowing from the connecting point P1 to the low-voltage DC/DC converter 22 when turned off.

The switching mechanism SW2 passes a current when turned on and interrupts a current when turned off. The switching mechanism SW2 is provided between the connecting point P2 and the connecting point P3 on the connecting wire L4 and passes or interrupts a current flowing between the connecting point P2 and the connecting point P3. For example, the switching mechanism SW2 passes a current flowing between the backup battery 23 and the load unit LD2 when turned on in response to a switching signal output from the backup controller 27 and interrupts a current flowing between the backup battery 23 and the load unit LD2 when turned off.

The switching mechanism SW3 passes a current when turned on and interrupts a current when turned off. The switching mechanism SW3 is provided on a connecting wire L5 connecting the connecting point P2 and the discharge circuit 25, and passes or interrupts a current flowing between the backup battery 23 and the discharge circuit 25. For example, the switching mechanism SW3 passes a current flowing between the backup battery 23 and the discharge circuit 25 when turned on in response to a switching signal output from the backup controller 27 and interrupts a current flowing between the backup battery 23 and the discharge circuit 25 when turned off.

The discharge circuit 25 discharges the backup battery 23. The discharge circuit 25 is connected to the backup battery 23 via the switching mechanism SW3. The discharge circuit 25 includes a resistor, a current sensor, and a voltage sensor that are not illustrated. The resistor functions as resistance to a current flowing from the backup battery 23 during an on-state of the switching mechanism SW3. The current sensor detects a current flowing from the backup battery 23 during an on-state of the switching mechanism SW3. The current sensor is connected to the backup controller 27 and outputs a detected current value to the backup controller 27. The voltage sensor detects a voltage applied by the backup battery 23 during an on-state of the switching mechanism SW3. The voltage sensor is connected to the backup controller 27 and outputs a detected voltage value to the backup controller 27.

The backup storage unit 26 is a nonvolatile memory that stores therein information. The backup storage unit 26 is a storage unit different from the above-described main storage unit 13 and stores therein a second control program for operating the backup controller 27. The second control program is a program different from the above-described first control program. Specifically, the second control program is written in a source code different from that of the first control program.

The backup controller 27 controls the low-voltage DC/DC converter 22 and the switching mechanisms SW1 to SW3. The backup controller 27 includes an electronic circuit formed mainly of a known microcomputer including a CPU and an interface. The backup controller 27 is connected to the backup storage 26 and reads out the second control unit 21 and program stored in the backup storage unit 26. Then, the backup controller 27 operates in accordance with the second control program as read out. Thus, the vehicle power-supply system 1, in which the backup controller 27 operates in accordance with the second control program different from that of the main controller 14, can add the backup power-supply device 20 to the vehicle without a change of the specification of the first control program of the main power-supply device 10. Further, the vehicle power-supply system 1 can equalize the specifications of the first control programs of the respective main power-supply devices 10 in a vehicle mounting the backup power-supply device 20 and a vehicle not mounting the backup power-supply device 20. Thus, the vehicle power-supply system 1 can easily add the backup power-supply device 20 and improves the mountability of the backup power-supply device 20. Whether to mount the backup power-supply device 20 in a vehicle depends on a level of automatic driving, for example. However, under the present circumstances, most vehicles mount no backup power-supply device. Therefore, there is much merit in facilitating mounting of a backup power-supply device in a vehicle according to the present invention.

The backup controller 27 monitors a power storage state of the backup battery 23, for example, in accordance with the second control program, and controls the low-voltage DC/DC converter 22 in accordance with the power storage state of the backup battery 23. For example, when a power storage rate of the backup battery 23 is lower than a second reference value determined in advance, the backup controller 27 increases an output voltage of the low-voltage DC/DC converter 22 and charges the backup battery 23. On the other hand, when a power storage rate of the backup battery 23 is equal to or higher than the second reference value, the backup controller 27 reduces an output voltage of the low-voltage DC/DC converter 22 and maintains the power storage rate of the backup battery 23 as it is. Further, the backup controller 27 determines the deterioration level of the backup battery 23 based on a current value and a voltage value of the backup battery 23 output from the discharge circuit 25. Moreover, the backup controller 27 outputs a switching signal to the switching mechanism SW1, the switching mechanism SW2, and the switching mechanism SW3 to switch each state of the switching mechanisms between an on-state and an off-state, if necessary.

Figure 2:
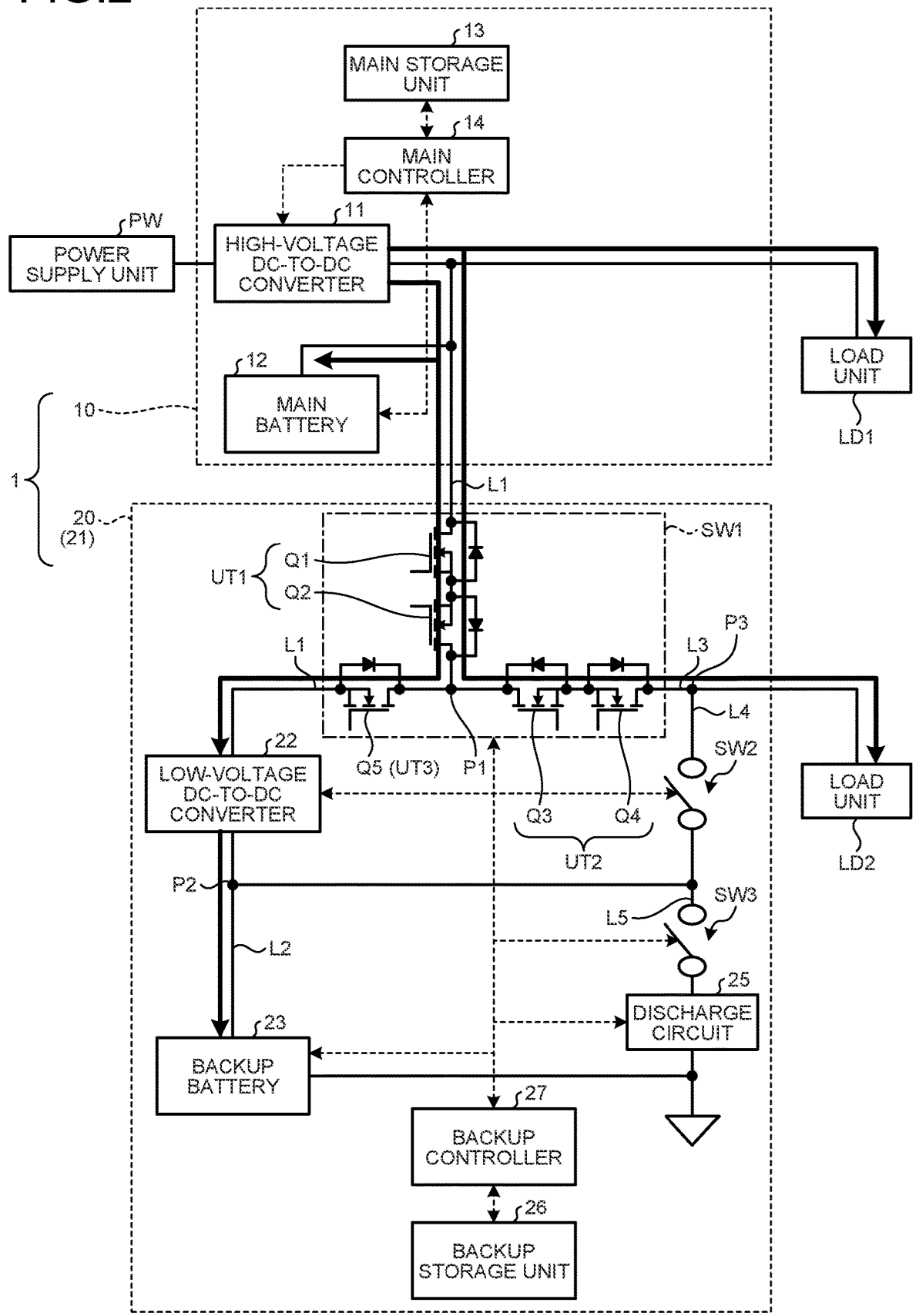
FIG. 2 is a block diagram illustrating a first operation example of the vehicle power-supply system according to the embodiment.

Next, operation examples of the vehicle power-supply system 1 will be described. FIG. 2 is a block diagram illustrating a first operation example of the vehicle power-supply system 1 according to the embodiment. In the example in FIG. 2, there is illustrated a case in which the main power-supply device 10 and the backup power-supply device 20 are normally operating, power is supplied to the load units LD1 and LD2 from the high-voltage DC/DC converter 11, and charging of the main battery 12 and the backup battery 23 is performed in this case, the backup controller 27 switches the switching mechanism SW1 to an on-state and switches the switching mechanisms SW2 and SW3 to an off-state to drive the low-voltage DC/DC converter 22. At that time, the backup controller 27 turns on all of the FET Q1, the FET Q2, the FET Q3, the FET Q4, and the FET Q5 in the switching mechanism SW1. Thus, the backup power-supply device 20 can output power supplied from the high-voltage DC/DC converter 11, to the load unit LD2 via the switching mechanism SW1. Further, the backup power-supply device 20 can output power supplied from the high-voltage DC/DC converter 11, to the low-voltage DC/DC converter 22 via the switching mechanism SW1 and charge the backup battery 23 with power stepped up by the low-voltage DC/DC converter 22.

Figure 3:
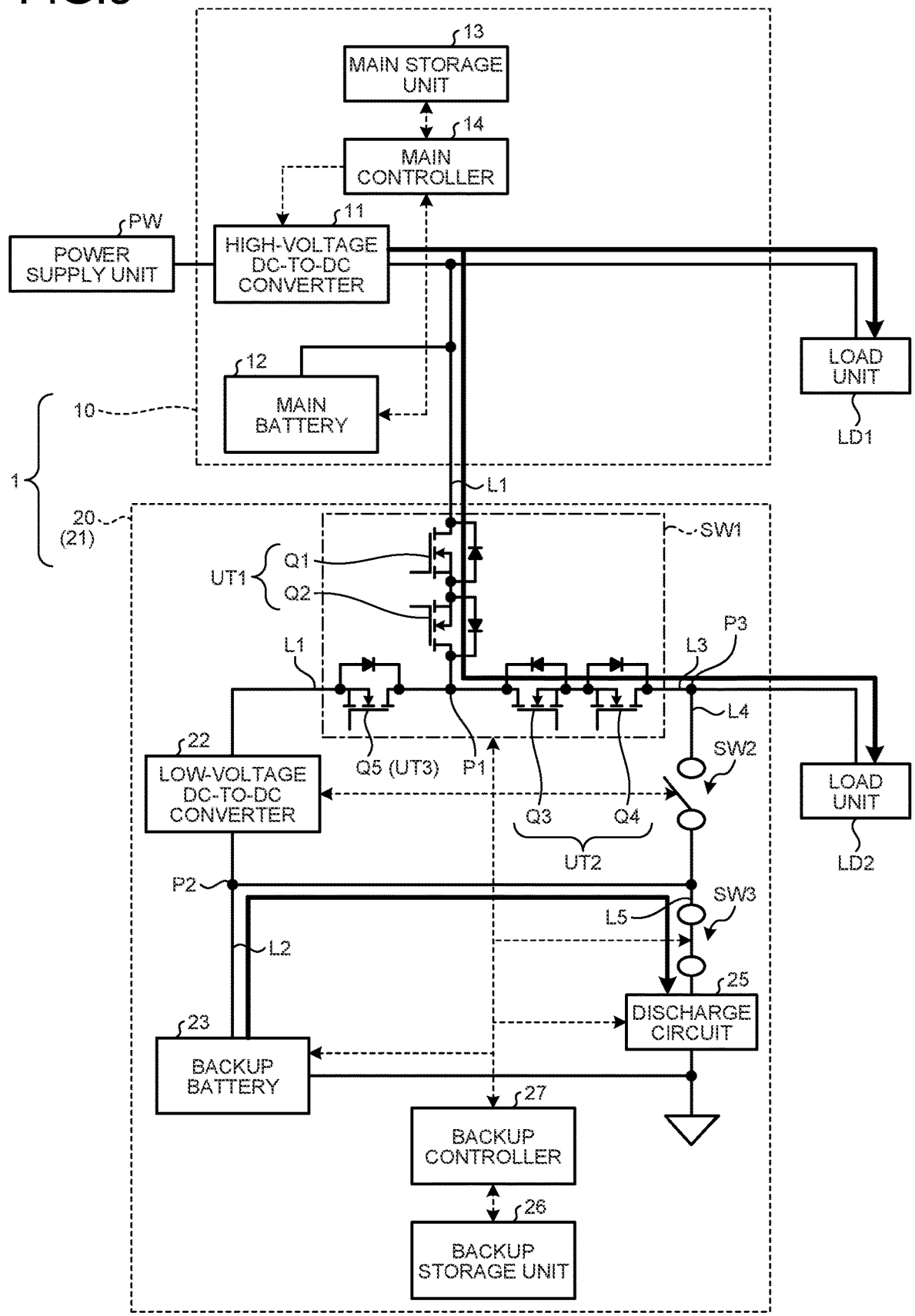
FIG. 3 is a block diagram illustrating a second operation example of the vehicle power-supply system according to the embodiment.

FIG. 3 is a block diagram illustrating a second operation example of the vehicle power-supply system 1 according to the embodiment. In the example in FIG. 3, there is illustrated a case in which the main power-supply device 10 and the backup power-supply device 20 are normally operating, power is supplied to the load units LD1 and LD2 from the high-voltage DC/DC converter 11, and the deterioration level of the backup battery 23 is determined. In this case, the backup controller 27 switches the switching mechanism SW1 and the switching mechanism SW3 to an on-state and switches the switching mechanism SW2 to an off-state to bring the low-voltage DC/DC converter 22 into a stopped state. At that time, the backup controller 27 turns on all of the FET Q1, the FET Q2, the FET Q3, the FET Q4, and the FET Q5 in the switching mechanism SW1. Thus, the backup power-supply device 20 can output power supplied from the high-voltage DC/DC converter 11, to the load unit LD2 via the switching mechanism SW1. Further, the backup power-supply device 20 can prevent power supplied from the high-voltage DC/DC converter 11 from being supplied to the backup battery 23 because the low-voltage DC/DC converter 22 is stopped. Moreover, the backup power-supply device 20 can supply power to the discharge circuit 25 from the backup battery 23.

Figure 4:
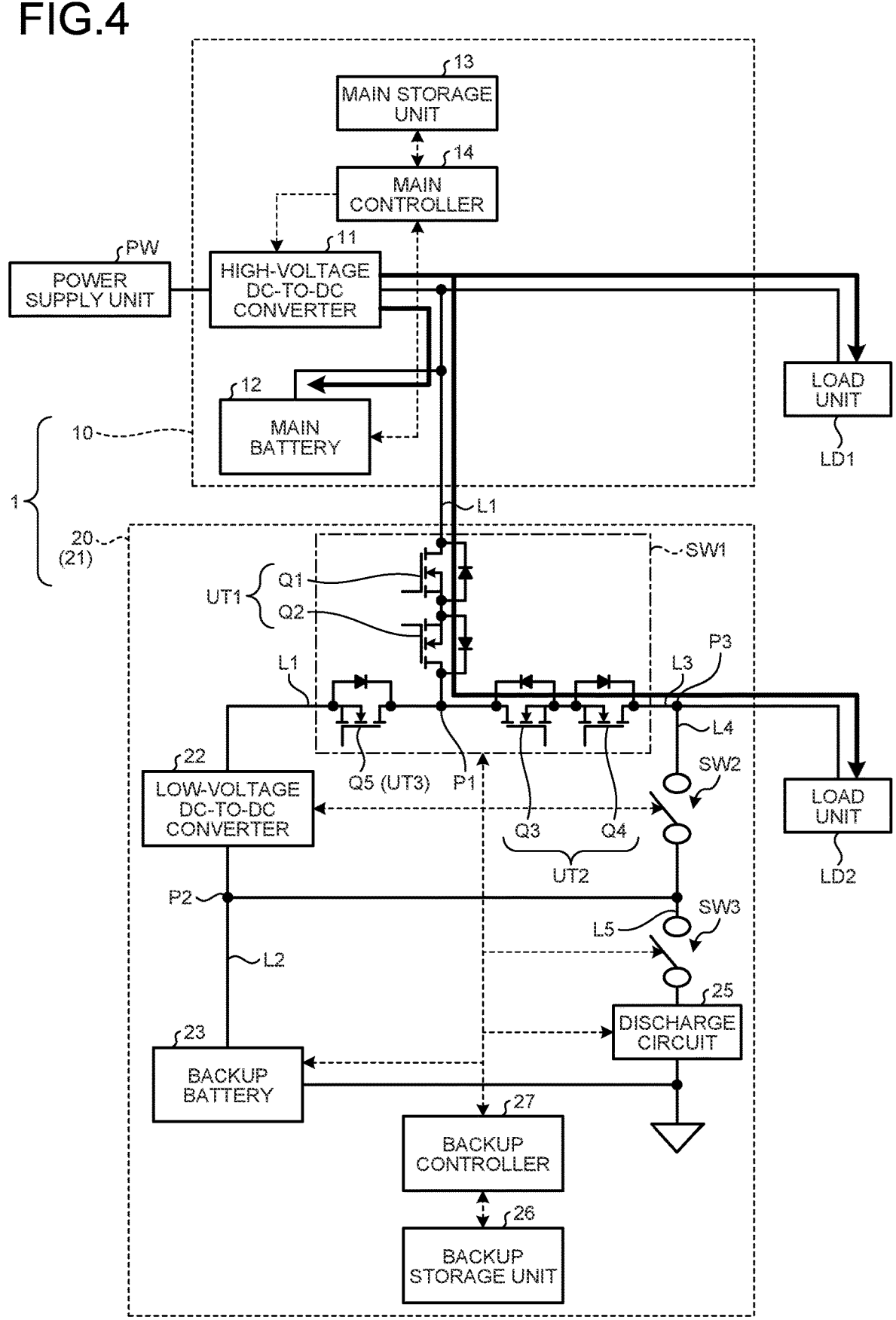
FIG. 4 is a block diagram illustrating a third operation example of the vehicle power-supply system according to the embodiment.

FIG. 4 is a block diagram illustrating a third operation example of the vehicle power-supply system 1 according to the embodiment. In the example in FIG. 4, there is illustrated a case in which the main power-supply device 10 and the backup power-supply device 20 are normally operating, power is supplied to the load units LD1 and LD2 from the high-voltage DC/DC converter 11, and charging of the main battery 12 is performed. In this case, the backup controller 27 switches the switching mechanism SW1 to an on-state and switches the switching mechanisms SW1 and SW3 to an off-state to bring the low-voltage DC/DC converter 22 into a stopped state. At that time, the backup controller 27 turns on all of the FET Q1, the FET Q2, the FET Q3, the FET Q4, and the FET Q5 in the switching mechanism SW1. Thus, the backup power-supply device 20 can output power supplied from the high-voltage DC/DC converter 11, to the load unit LD2 via the switching mechanism SW1. Further, the backup power-supply device 20 can prevent power supplied from the high-voltage DC/DC converter 11 from being supplied to the backup battery 23 because the low-voltage DC/DC converter 22 is stopped.

Figure 5:
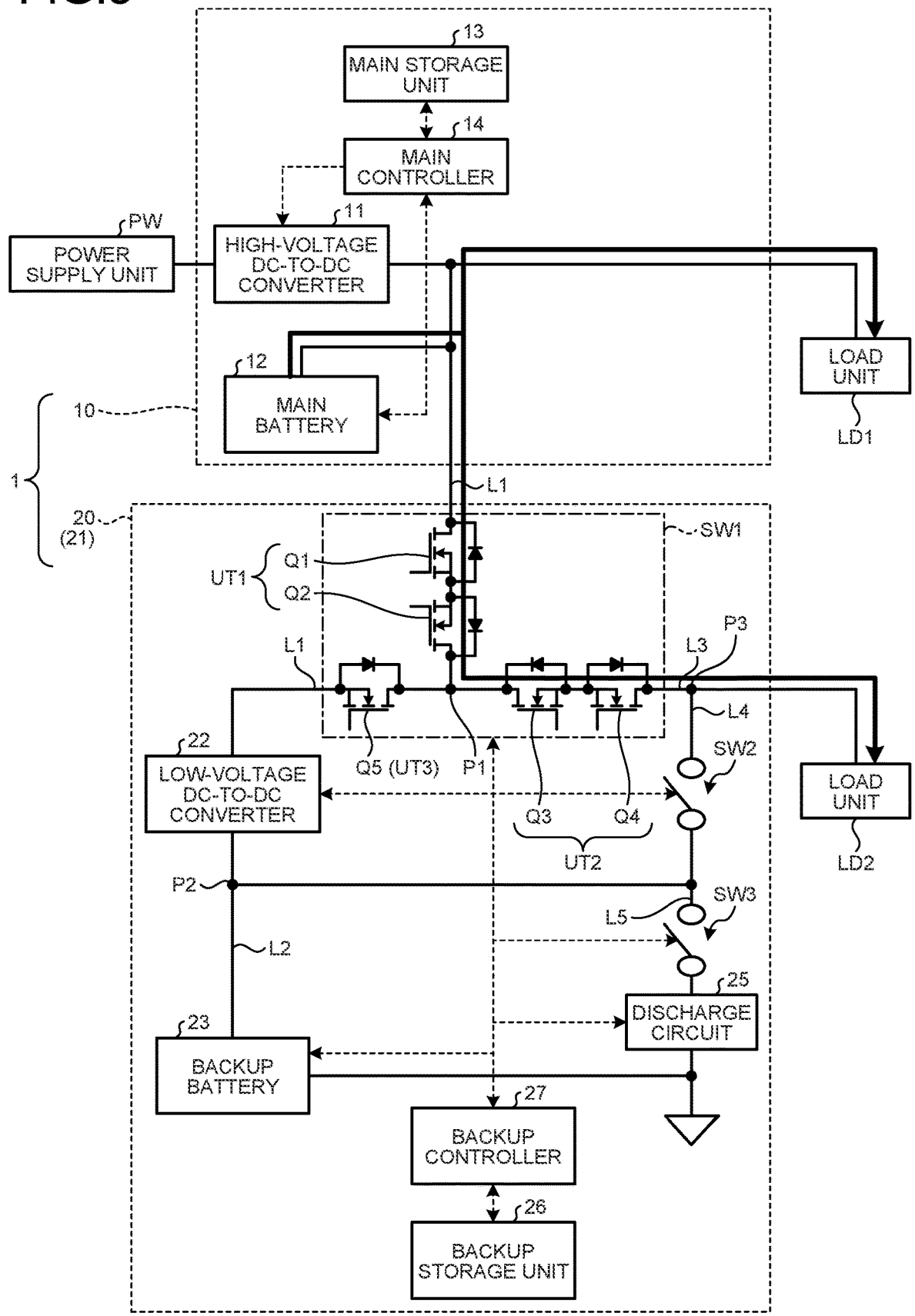
FIG. 5 is a block diagram illustrating a fourth operation example of the vehicle power-supply system according to the embodiment.

FIG. 5 is a block diagram illustrating a fourth operation example of the vehicle power-supply system 1 according to the embodiment. In the example in FIG. 5, there is illustrated a case in which the main power-supply device 10 and the backup power-supply device 20 are normally operating and power is supplied to the load units LD1 and LD2 from the main battery 12. In this case, the backup controller 27 switches the switching mechanism SW1 to an on-state and switches the switching mechanisms SW2 and SW3 to an off-state to bring the low-voltage DC/DC converter 22 into a stopped state. At that time, the backup controller 27 turns on all of the FET Q1, the FET Q2, the FET Q3, the FET Q4, and the FET Q5 in the switching mechanism SW1. Thus, the backup power-supply device 20 can output power supplied from the main battery 12, to the load unit LD2 via the switching mechanism SW1. Further, the backup power-supply device 20 can prevent power supplied from the main battery 12 from being supplied to the backup battery 23 because the low-voltage DC/DC converter 22 is stopped.

Figure 6:
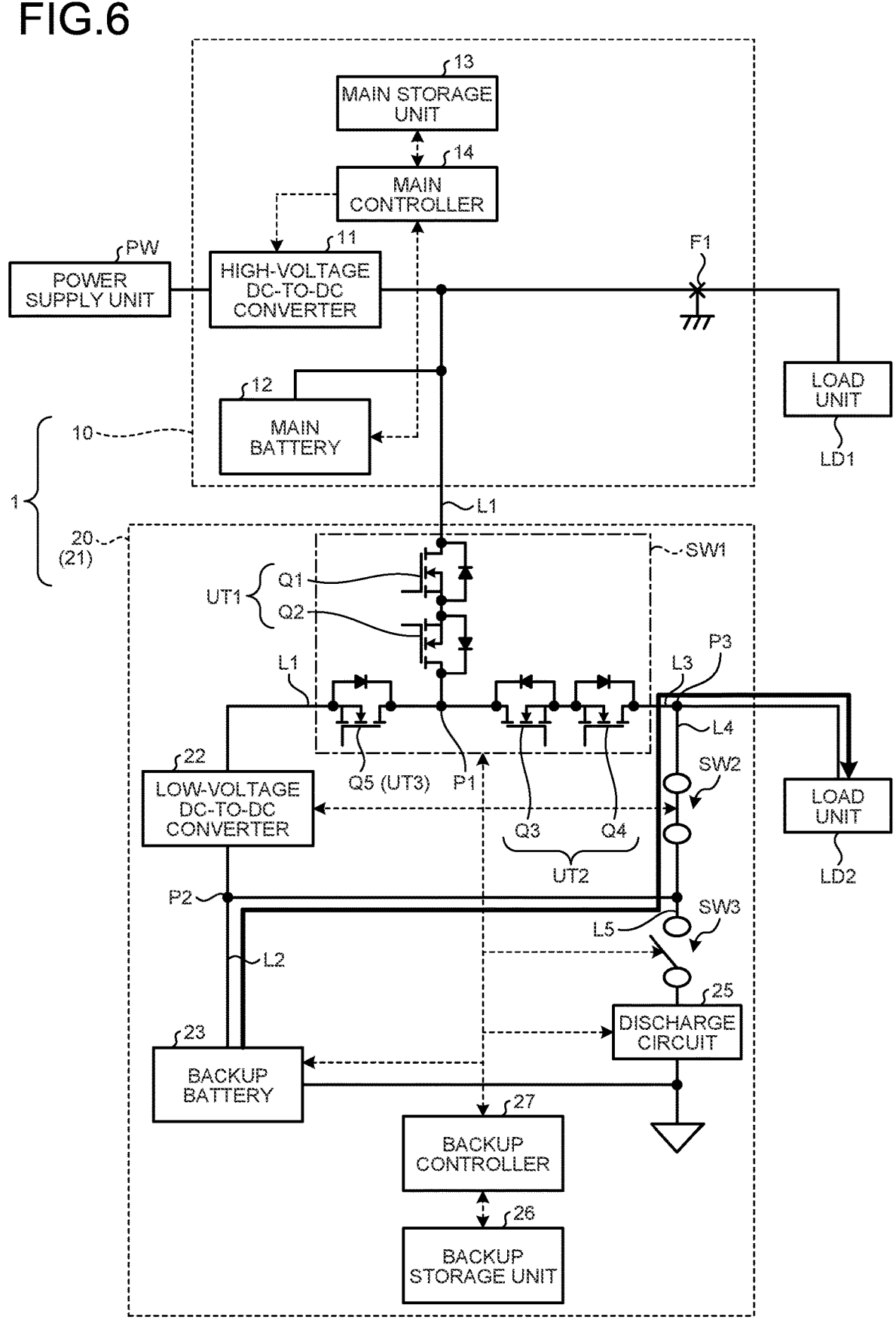
FIG. 6 is a block diagram illustrating a fifth operation example of the vehicle power-supply system according to the embodiment.

FIG. 6 is a block diagram illustrating fifth operation example of the vehicle power-supply system 1 according to the embodiment. In the example in FIG. 6, there is illustrated a case in which the main power-supply device 10 is in an abnormal state and the backup power-supply device 20 is normally operating. Here, a ground fault F1 occurs near the load unit LD1 in the main power-supply device 10. In this case, a voltage of the main power-supply device 10, i.e., an output thereof, is reduced due to the ground fault, and thus the main power-supply device 10 outputs a voltage signal indicating the abnormality to the backup power-supply device 20. The backup controller 27, upon receipt of the voltage signal from the main power-supply device 10, switches the switching mechanism SW1 and the switching mechanism SW3 to an off-state and switches the switching mechanism SW2 to an on-state to bring the low-voltage DC/DC converter 22 into a stopped state. At that time, the backup controller 27 turns off all of the FET Q1, the FET Q2, the FET Q3, the FET Q4, and the FET Q5 in the switching mechanism SW1. Thus, the backup power-supply device 20 can supply power to the load unit LD2 from the backup battery 23. In other words, the backup power-supply device 20 can interrupt electrical connection with the main power-supply device 10, thereby preventing a current of power supplied from the backup battery 23 from flowing to the point of the ground fault F1. At that time, even if one of the FET Q2 and the FET Q4 becomes unable to be switched from an on-state to an off-state to have a fault of being fixed to an on-state, the backup power-supply device 20 can prevent a current of power supplied from the backup battery 23 to the load unit LD2 from flowing to the point of the ground fault F1 in the main power-supply device 10, by using the other of the FET Q2 and the FET Q4. In this manner, the vehicle power-supply system 1 can supply power to the load unit LD2 from the backup battery 23 even in the event of occurrence of the ground fault F1 in the main power-supply device 10 and occurrence of abnormality in the switching mechanism SW1, that is, even in the event of occurrence of two kinds of abnormalities.

Figure 7:
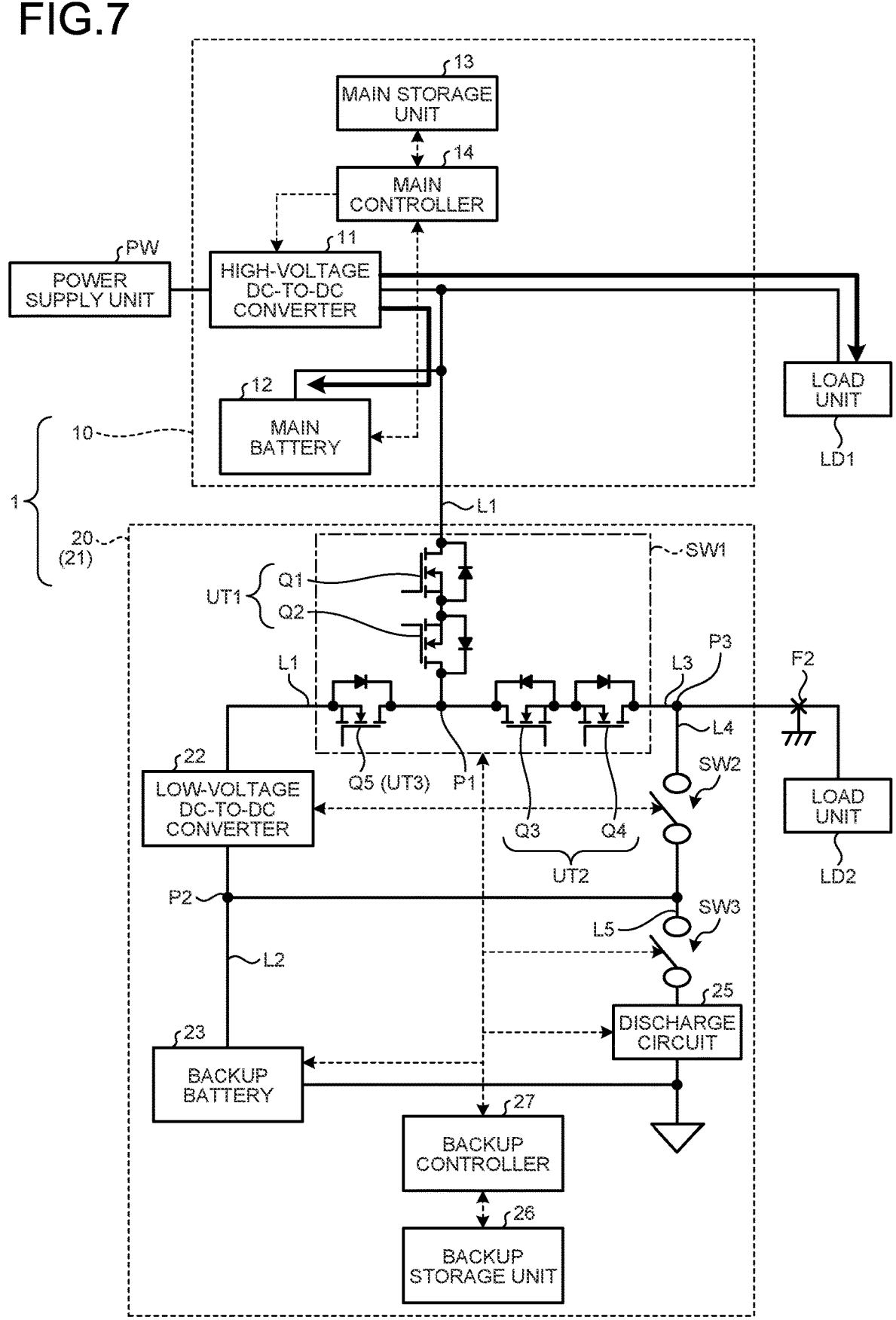
FIG. 7 is a block diagram illustrating a sixth operation example of the vehicle power-supply system according to the embodiment.

FIG. 7 is a block diagram illustrating a sixth operation example of the vehicle power-supply system according to the embodiment. In the example in FIG. 7, there is illustrated a case in which the main power-supply device 10 is normally operating and the backup power-supply device 20 is in an abnormal state. Here, a ground fault F2 occurs near the load unit LD2 in the backup power-supply device 20. In this case, the backup controller 27 switches the switching mechanism SW1 and the switching mechanisms SW2 and SW3 to an off-state to bring the low-voltage DC/DC converter 22 into a stopped state. At that time, the backup controller 27 turns off ail of the FET Q1, the FET Q2, the FET Q3, the FET Q4, and the FET Q5 in the switching mechanism SW1. Thus, the backup power-supply device 20 can interrupt electrical connection with the main power-supply device 10, thereby preventing a current of power supplied from the main power-supply device 10 from flowing to the point of the ground fault F2. At that time, even if one of the FET Q1 and the FET Q3 has a fault of being fixed to an on-state, the backup power-supply device 20 can prevent a current of power supplied from the high-voltage DC/DC converter 11 to the load unit LD1 from flowing to the point of the ground fault F2 in the backup power-supply device 20, by using the other of the FET Q1 and the FET Q3. Further, the backup power-supply device 20 can stop power supplied from the backup battery 23 to the load unit LD2, thereby preventing a current from flowing to the point of the ground fault F2 from the backup battery 23. Moreover, the backup power-supply device 20, which includes the low-voltage DC/DC converter 22 that is a unidirectional converter, can prevent a current of power supplied from the backup battery 23 from flowing to the point of the ground fault F2 via the low-voltage DC/DC converter 22. In this manner, the vehicle power-supply system 1 can supply power to the load unit LD1 from the high-voltage DC/DC converter 11 even in the event of occurrence of the ground fault F2 in the backup power-supply device 20 and occurrence of abnormality in the switching mechanism SW1, that is, even in the event of occurrence of two kinds of abnormalities.

Figure 8:
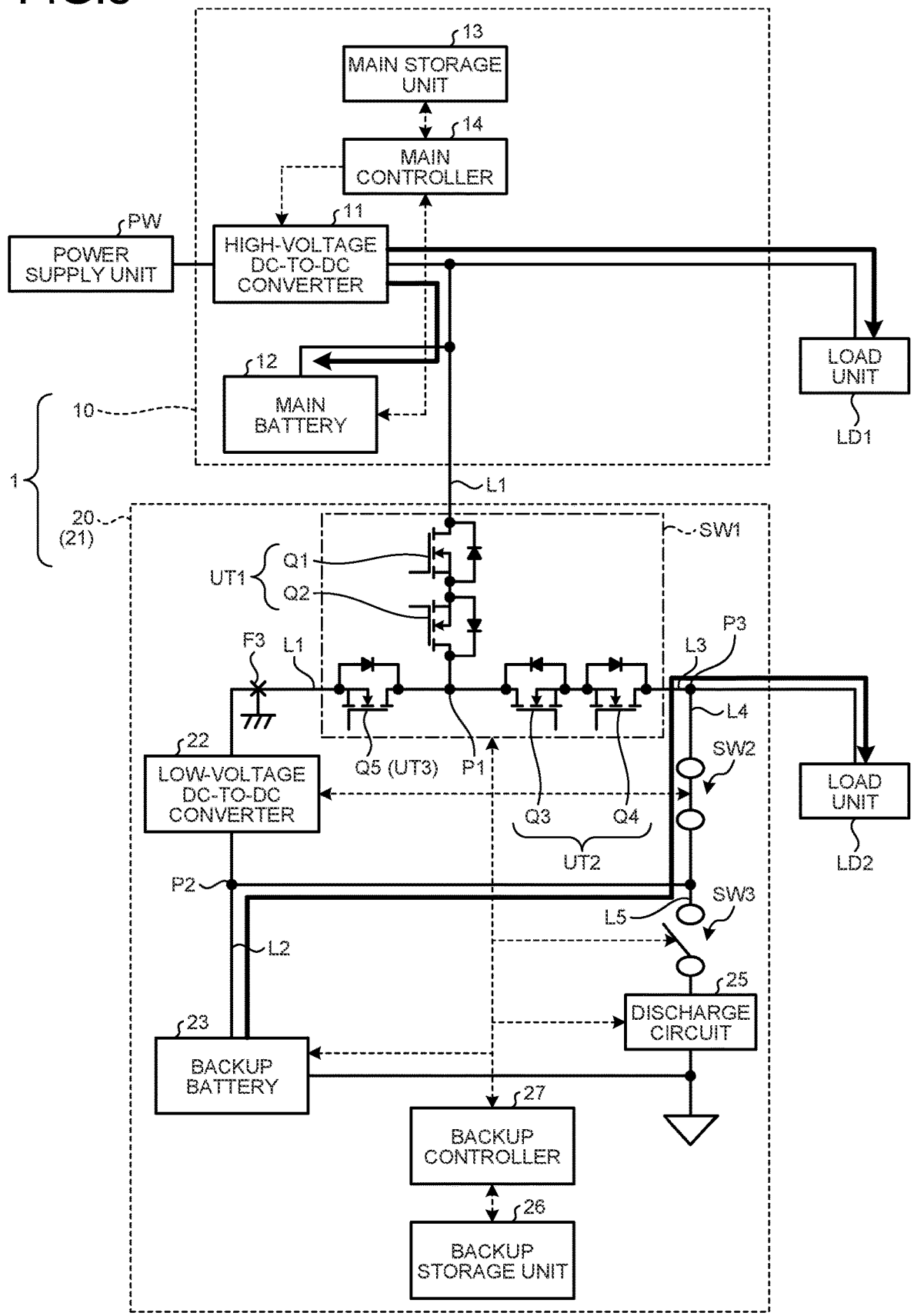
FIG. 8 is a block diagram illustrating a seventh operation example of the vehicle power-supply system according to the embodiment.

FIG. 8 is a block diagram illustrating a seventh operation example of the vehicle power-supply system 1 according to the embodiment. In the example in FIG. 8, there is illustrated a case in which the main power-supply device 10 is normally operating and the backup power-supply device 20 is in an abnormal state. Here, a ground fault F3 occurs between the low-voltage DC/DC converter 22 and the switching mechanism SW1 in the backup power-supply device 20. In this case, the backup controller 27 switches the switching mechanism SW1 and the switching mechanism SW3 to an off-state and switches the switching mechanism SW2 to an on-state to bring the low-voltage DC/DC converter 22 into a stopped state. At that time, the backup controller 27 turns off all of the FET Q1, the FET Q2, the FET Q3, the FET Q4, and the FET Q5 in the switching mechanism SW1. Thus, electrical connection between the main power-supply device 10 and the backup power-supply device 20 is interrupted, so that the main power-supply device 10 can supply power to the load unit LD1 and the main battery 12 from the high-voltage DC/DC converter 11. At that time, even if one of the FET Q1 and the FET Q5 becomes unable to be switched from an on-state to an off-state to have a fault of being fixed to an on-state, the backup power-supply device 20 can prevent a current of power supplied from the main power supply device 10 to the load unit LD1 and the like from flowing to the point of the ground fault F3, by using the other of the FET Q1 and the FET Q5.

Further, the backup power-supply device 20 can supply power to the load unit LD2 from the backup battery 23. More specifically, the backup power-supply device 20 can be electrically disconnected from the point of the ground fault F3 with the switching mechanism SW1 and the low-voltage DC/DC converter 22, thereby preventing power supplied from the backup battery 23 from flowing to the point of the ground fault F3. At that time, even if one of the FET Q4 and the FET Q5 has a fault of being fixed to an on-state, the backup power-supply device 20 can prevent a current of power supplied from the backup battery 23 to the load unit LD2 from flowing to the point of the ground fault F3 by using the other of the FET Q4 and the FET Q5. In this manner, the vehicle power-supply system 1 can supply power to the load unit LD1 from the main power-supply device 10 and also can supply power to the load unit LD2 from the backup battery 23 even in the event of occurrence of the ground fault F3 in the backup power-supply device 20 and occurrence of abnormality in the switching mechanism SW1, that is, even in the event of occurrence of two kinds of abnormalities.

As described above, the vehicle power-supply system 1 according to the embodiment includes the main power-supply device 10 that is mounted in a vehicle and supplies power to the load unit LD1 and the load unit LD2, and the backup power-supply device 20 that is mounted in the vehicle and supplies power to the load unit LD2 while supplying no power to the load unit LD1 when the main power-supply device 10 is in an abnormal state. The main power-supply device 10 includes the high-voltage DC/DC converter 11 and the main battery 12. The high-voltage DC/DC converter 11 supplies direct-current power that is supplied from the power supply unit PW and is at a voltage transformed by the high-voltage DC/DC converter 11, to the load unit LD1 and the load unit LD2. The main battery 12 in which the direct-current power transformed by the high-voltage DC/DC converter 11 is stored supplies the direct-current power to the load unit IDI and the load unit LD2.

The backup power-supply device 20 includes the low-voltage DC/DC converter 22, the backup battery 23, the switching mechanism SW1, the switching mechanism SW2, the connecting wire L1, the connecting wire L2, the connecting wire L3, and the connecting wire L4. The low-voltage DC/DC converter 22 transforms a voltage of direct-current power output from the high-voltage DC/DC converter 11. The backup battery 23 in which the direct-current power transformed by the low-voltage DC/DC converter 22 is stored supplies the direct-current power to the load unit LD2. Each of the switching mechanisms SW1 and SW2 passes or interrupts a current. The connecting wire L1 connects the high-voltage DC/DC converter 11 and the low-voltage DC/DC converter 22. The connecting wire 12 connects the low-voltage DC/DC converter 22 and the backup battery 23. The connecting wire L3 connects the connecting point P1 on the connecting wire L1 and the load unit LD2. The connecting wire L4 connects the connecting point P2 on the connecting wire L2 and the connecting point P3 on the connecting wire L3. The switching mechanism SW2 is provided between the connecting point P2 and the connecting point P3 on the connecting wire L4 and passes or interrupts a current flowing between the connecting point P2 and the connecting point P3.

The switching mechanism SW1 includes the bidirectional switch unit UT1, the bidirectional switch unit UT2, and the unidirectional switch unit UT3. The bidirectional switch unit UT1 includes the FET Q1 and the FET Q2 and is connected so that the FETs Q1 and Q2 are so positioned as to make a forward direction of a parasitic diode of the FET Q1 and a forward direction of a parasitic diode of the FET Q2, opposite to each other. The bidirectional switch unit UT2 includes the FET Q3 and the FET Q4 and is connected so that the FET Q3 and the FET Q4 are so positioned as to make a for direction of a parasitic diode of the FET Q3 and a forward direction of a parasitic diode of the FET Q4, opposite to each other. The unidirectional switch unit UT3 includes the FET Q5.

The bidirectional switch unit UT1 is provided between the high-voltage DC/DC converter 11 and the connecting point P1 on the connecting wire L1 and passes or interrupts a current flowing between the high-voltage DC/DC converter 11 and the connecting point P1. The bidirectional switch unit UT2 is provided between the connecting point P1 and the connecting point P3 on the connecting wire L3 and passes or interrupts a current flowing between the connecting point P1 and the connecting point P3. The unidirectional switch unit UT3 is provided between the connecting point P1 and the low-voltage DC/DC converter 22 on the connecting wire L1 and passes or interrupts a current flowing from the connecting point P1 to the low-voltage DC/DC converter 22.

With this configuration, in a case where the ground fault F1 occurs near the load unit LD1 and one of the FET Q2 and the FET Q4 has a fault of being fixed to an on-state, the vehicle power-supply system 1 can prevent a current of power supplied from the backup battery 23 to the load unit LD2 from flowing to the main power-supply device 10, by using the other of the FET Q2 and the FET Q4. Further, in a case where the ground fault F2 occurs near the load unit LD2 and one of the FET Q1 and the FET Q3 has a fault of being fixed to an on-state, the vehicle power-supply system 1 can prevent a current of power supplied from the main battery 12 or the high-voltage DC/DC converter 11 to the load unit LD1 from flowing to the backup power-supply device 20, by using the other of the FET Q1 and the FET Q3.

Moreover, in a case where the ground fault F3 occurs near the low-voltage DC/DC converter 22 and one of the FET Q4 and the FET Q5 has a fault of being fixed to an on-state, the vehicle power-supply system 1 can prevent a current of power supplied from the backup battery 23 to the load unit LD2 from flowing to an area including the low-voltage DC/DC, converter 22, by using the other of the FET Q4 and the FET Q5. For the above-stated reasons, the vehicle power-supply system 1 can properly interrupt electrical connection between the main power-supply device 10 and the backup power-supply device 20 in a case where an abnormality occurs in either the main power-supply device 10 or the backup power-supply device 20 and a part of the switching mechanism SW1 has a fault. As a result of this, the vehicle power-supply system 1 can properly supply power to the load unit LD1 or the load unit LD2 even in the event of occurrence of abnormality.

In the above-described vehicle power-supply system 1, the backup power-supply device 20 further includes the backup controller 27 that controls the switching mechanism SW1 and the switching mechanism SW2. Each of the switching mechanism SW1 and the switching mechanism SW2 passes a current by turn-on and interrupts a current by turn-off. When the main power-supply device 10 is in an abnormal state and the backup power-supply device 20 is normally operating, the backup controller 27 turns off all of the FET Q1, the FET Q2, the FET Q3, the FET Q4, and the FET Q5 in the switching mechanism SW1 and turns on the switching mechanism SW2, to allow power to be supplied to the load unit LD2 from the backup battery 23 while interrupting electrical connection between the main power-supply device 10 and the backup power-supply device 20. Because of this configuration, the vehicle power-supply system 1 enables driving of a vehicle to a place where safety is secured, with power supplied from the backup battery 23 to the load unit LD2.

In the above-described vehicle power-supply system 1, when the main power-supply device 10 is normally operating and the backup power-supply device 20 is in an abnormal state, the backup controller 27 turns off all of the FET Q1, the FET Q2, the FET Q3, the FET Q4, and the FET Q5 in the switching mechanism SW1 and turns off the switching mechanism SW2, to forbid power to be supplied to the load unit LD2 from the backup battery 23 while interrupting electrical connection between the main power-supply device 10 and the backup power-supply device 20. Because of this configuration, the vehicle power-supply system 1 enables driving of a vehicle to a place where safety is secured, with power supplied from the main power-supply device 10 to the load unit LD1.

Additionally, though the above description has taken an example in which each of the FETs Q1 to Q5 is an N-channel MOSFET, the BETS Q1 to Q5 are not limited thereto. Each of the FETs Q1 to Q5 may be any of other switching elements such as a P-channel MOSFET or an insulated gate bipolar transistor (IGBT).

The load unit LD1 may include a general load of an air conditioner, an audio product, or the like, for example, and an important load of a first steering device, a first brake device, a first sensor, or the like. Meanwhile, the second load unit LD2 may include an important load of a second steering device, a second brake device, a second sensor, or the like. In this case, the load unit LD1 and the load unit LD2 are combined with each other to form an actuator serving as a single important load unit. The load unit LD1 and the load unit LD2 form a single actuator (steering device) by combination of a first steering instrument and a second steering instrument. Such an actuator performs a normal operation when the device of the load unit LD1 and the device of the load unit LD2 operate. On the other hand, when the device of the load unit LD1 does not operate and the device of the load unit LD2 operates, the actuator performs a limited operation with functions limited as compared to the normal operation. Additionally, the load unit LD1 may omit an important load.

In the vehicle power-supply system according to the present embodiments, the backup power-supply device includes the second DC/DC converter, the first switching mechanism, and the second switching mechanism, thereby interrupting electrical connection between the main power-supply device and the backup power-supply device at the time of occurrence of abnormality. This enables proper supply of power to the load unit even in the event of occurrence of abnormality.

Although the invention has been described with respect to specific embodiments for a complete and clear disclosure, the appended claims are not to be thus but are to be construed as embodying all modifications and alternative constructions that may occur to one skilled in the art that fairly fall within the basic teaching herein set forth.

What is claimed is:

1. A vehicle power-supply system comprising:
a main power-supply device mounted in a vehicle and configured to supply power to a first load unit and a second load unit; and
a backup power-supply device mounted in the vehicle and configured to supply power to the second load unit while supplying no power to the first load unit when the main power-supply device is in an abnormal state, wherein
the main power-supply device includes a first DC/DC converter configured to transform a voltage of direct-current power supplied from a power supply unit and supply the transformed direct-current power to the first load unit and the second load unit, and a first battery configured to store the direct-current power transformed by the first DC/DC converter and supply the stored direct-current power to the first load unit and the second load unit,
the backup power-supply device includes: a second DC/DC converter configured to transform a voltage of the direct-current power output from the first DC/DC converter; a second battery configured to store the direct-current power transformed by the second DC/DC converter and supply the stored direct-current power to the second load unit; a first switching mechanism and a second switching mechanism configured to pass or interrupt a current; a first connecting wire; a second connecting wire; a third connecting wire; and a fourth connecting wire,
the first connecting wire connects the first DC/DC converter and the second DC/DC converter,
the second connecting wire connects the second DC/DC converter and the second battery,
the third connecting wire connects a first connecting point on the first connecting wire and the second load unit,
the fourth connecting wire connects a second connecting point on the second connecting wire and a third connecting point on the third connecting wire,
the second switching mechanism is provided between the second connecting point and the third connecting point on the fourth connecting wire and passes or interrupts a current flowing between the second connecting point and the third connecting point, the first switching mechanism includes: a first bidirectional switch unit that includes a first semiconductor switch and a second semiconductor switch and is connected so that the first semiconductor switch and the second semiconductor switch are so positioned as to make a forward direction of a parasitic diode of the first semiconductor switch and a forward direction of a parasitic diode of the second semiconductor switch opposite to each other; a second bidirectional switch unit that includes a third semiconductor switch and a fourth semiconductor switch and is connected so that the third semiconductor switch and the fourth semiconductor switch are so positioned as to make a forward direction of a parasitic diode of the third semiconductor switch and a forward direction of a parasitic diode of the fourth semiconductor switch opposite to each other; and a unidirectional switch unit including a fifth semiconductor switch, the first bidirectional switch unit is provided between the first DC/DC converter and the first connecting point on the first connecting wire and passes or interrupts a current flowing between the first DC/DC converter and the first connecting point, the second bidirectional switch unit is provided between the first connecting point and the third connecting point on the third connecting wire and passes or interrupts a current flowing between the first connecting point and the third connecting point, and the unidirectional switch unit is provided between the first connecting point and the second DC/DC converter on the first connecting wire and passes or interrupts a current flowing from the first connecting point to the second DC/DC converter.

2. The vehicle power-supply system according to claim 1, wherein the backup power-supply device further includes a controller configured to control the first switching mechanism and the second switching mechanism, each of the first switching mechanism and the second switching mechanism passes a current by turn-on and interrupts a current by turn-off, and when the main power-supply device is in an abnormal state and the backup power-supply device is normally operating, the controller turns off all of the first semiconductor switch, the second semiconductor switch, the third semiconductor switch, the fourth semiconductor switch, and the fifth semiconductor switch in the first switching mechanism and turns on the second switching mechanism to allow power to be supplied to the second load unit from the second battery while interrupting electrical connection between the main power-supply device and the backup power-supply device.

3. The vehicle power-supply system according to claim 1, wherein the backup power-supply device further includes a controller configured to control the first switching mechanism and the second switching mechanism, each of the first switching mechanism and the second switching mechanism passes a current by turn-on and interrupts a current by turn-off, and when the main power supply device is normally operating and the backup power-supply device is in an abnormal state, the controller turns off all of the first semiconductor switch, the second semiconductor switch, the third semiconductor switch, the fourth semiconductor switch, and the fifth semiconductor switch in the first switching mechanism and turns off the second switching mechanism to forbid power to be supplied to the second load unit from the second battery while interrupting electrical connection between the main power-supply device and the backup power-supply device.

4. The vehicle power-supply system according to claim 2, wherein the backup power-supply device further includes a controller configured to control the first switching mechanism and the second switching mechanism, each of the first switching mechanism and the second switching mechanism passes a current by turn-on and interrupts a current by turn-off, and when the main power-supply device is normally operating and the backup power-supply device is in an abnormal state, the controller turns off all of the first semiconductor switch, the second semiconductor switch, the third semiconductor switch, the fourth semiconductor switch, and the fifth semiconductor switch in the first switching mechanism and turns off the second switching mechanism to forbid power to be supplied to the second load unit from the second battery while interrupting electrical connection between the main power-supply device and the backup power-supply device.

* * * * *